US006679234B2

United States Patent
(12) United States Patent
Maier et al.

(10) Patent No.: US 6,679,234 B2
(45) Date of Patent: Jan. 20, 2004

(54) MANUALLY GUIDED IMPLEMENT HAVING AN INTERNAL COMBUSTION ENGINE

(75) Inventors: Georg Maier, Kernen (DE); Ralf Tuckermann, Stuttgart (DE); Günter Wolf, Oppenweiler (DE); Philipp Neumann, Stuttgart (DE); Rebekka Helfen, Stuttgart (DE); Maximilian Eberhardt, Esslingen (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 10/085,729

(22) Filed: Feb. 28, 2002

(65) Prior Publication Data

US 2002/0124837 A1 Sep. 12, 2002

(30) Foreign Application Priority Data

Mar. 6, 2001 (DE) .................................... 201 03 829 U

(51) Int. Cl.[7] ................................................ F02M 17/50
(52) U.S. Cl. ....................................... 123/543; 123/545
(58) Field of Search ................................ 123/557, 545, 123/543

(56) References Cited

U.S. PATENT DOCUMENTS

| | | | | | |
|---|---|---|---|---|---|
| 4,401,090 | A | * | 8/1983 | Fujimoto et al. | 123/545 |
| 4,414,932 | A | * | 11/1983 | Lindberg | 123/543 |
| 5,040,517 | A | * | 8/1991 | Cox | 123/545 |
| 5,101,801 | A | * | 4/1992 | Schatz | 123/545 |
| 5,119,794 | A | * | 6/1992 | Kushida et al. | 123/557 |
| 5,483,943 | A | * | 1/1996 | Peters | 123/557 |
| 6,474,317 | B2 | * | 11/2002 | Okuzawa et al. | 123/543 |

* cited by examiner

*Primary Examiner*—Marguerite McMahon
(74) *Attorney, Agent, or Firm*—R. W. Becker & Assoc.; R. W. Becker

(57) ABSTRACT

A manually guided implement having an internal combustion engine and a carburetor for supplying the engine with a fuel/air mixture is provided. A combustion air stream is drawn in through the carburetor by the engine. A warming medium heated up by the engine can be passed along the outer surfaces of the carburetor separate from the combustion air stream.

25 Claims, 5 Drawing Sheets

13
38
1
43
20
20
40
6
7
20
23
21
44
19
4

50
47
17
16
52
10
13
2
9
11
49
23
26
31
22
4
15
8
48
7
12

MANUALLY GUIDED IMPLEMENT HAVING AN INTERNAL COMBUSTION ENGINE

BACKGROUND OF THE INVENTION

The present invention relates to a manually guided implement, such as a chainsaw, a brush cutter, a trimmer, a cut-off machine, or the like, and has an internal combustion engine and a carburetor for supplying a fuel/air mixture to the engine, wherein a stream of air for combustion is drawn through the carburetor via the engine.

Manually guided implements having an internal combustion engine as the drive motor are operated under changing climatic conditions. In this connection, the internal combustion engine draws in air for combustion from the atmosphere through the carburetor to form a fuel/air mixture. The drawn-in air for combustion is, of course, influenced by the environmental conditions, especially with regard to its temperature and moisture content.

Within the carburetor, the stream of air for combustion has a relatively low speed, which is accompanied by a drop in pressure, relative to the atmospheric pressure. In a narrowed cross-sectional portion of the carburetor, for example in the form of a venturi section, a further drop in pressure in the stream of air for combustion is produced for the drawing-in of the fuel through a fuel nozzle. The temperature drop that accompanies the drop in pressure in the combustion air stream, and in particular the temperature drop that is caused by the vaporization enthalpy of the fuel that is volatilized in the carburetor, can lead to a condensation of moisture in the air. At lower temperatures, especially around the freezing point, the condensed moisture can freeze up or ice over the carburetor in the region of the fuel nozzle, which adversely affects the formation of the mixture. The result is an unsteady running of the engine or even a stopping of the engine. Icing over is particularly detrimental on the butterfly valve and on its seat in the venturi section, since as a result the air gap during idling is closed off. This causes the engine to die during idling.

Various embodiments of manually guided implements are known that are provided with means for preventing icing over of the carburetor. For example, the carburetor can if necessary be heated with electrical heating wires, whereby, however, the technical conversion is complicated and hence expensive. The air for combustion can also be preheated, for which purpose it is guided past hot portions of the internal combustion engine. During the intake process through the carburetor, the heated combustion air has an adequate excess temperature to avoid condensation of water and hence an icing over. However, a drawback of this arrangement is the increased complexity of the combustion air guidance, along with corresponding output-retarding flow resistance and the increase of the air moisture due to evaporating drops and melting ice. A further drawback is in the reduction of the air density, which can similarly cause a drop in output of the internal combustion engine.

It is therefore an object of the present invention to reliably prevent icing over of the carburetor of a manually guided implement.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
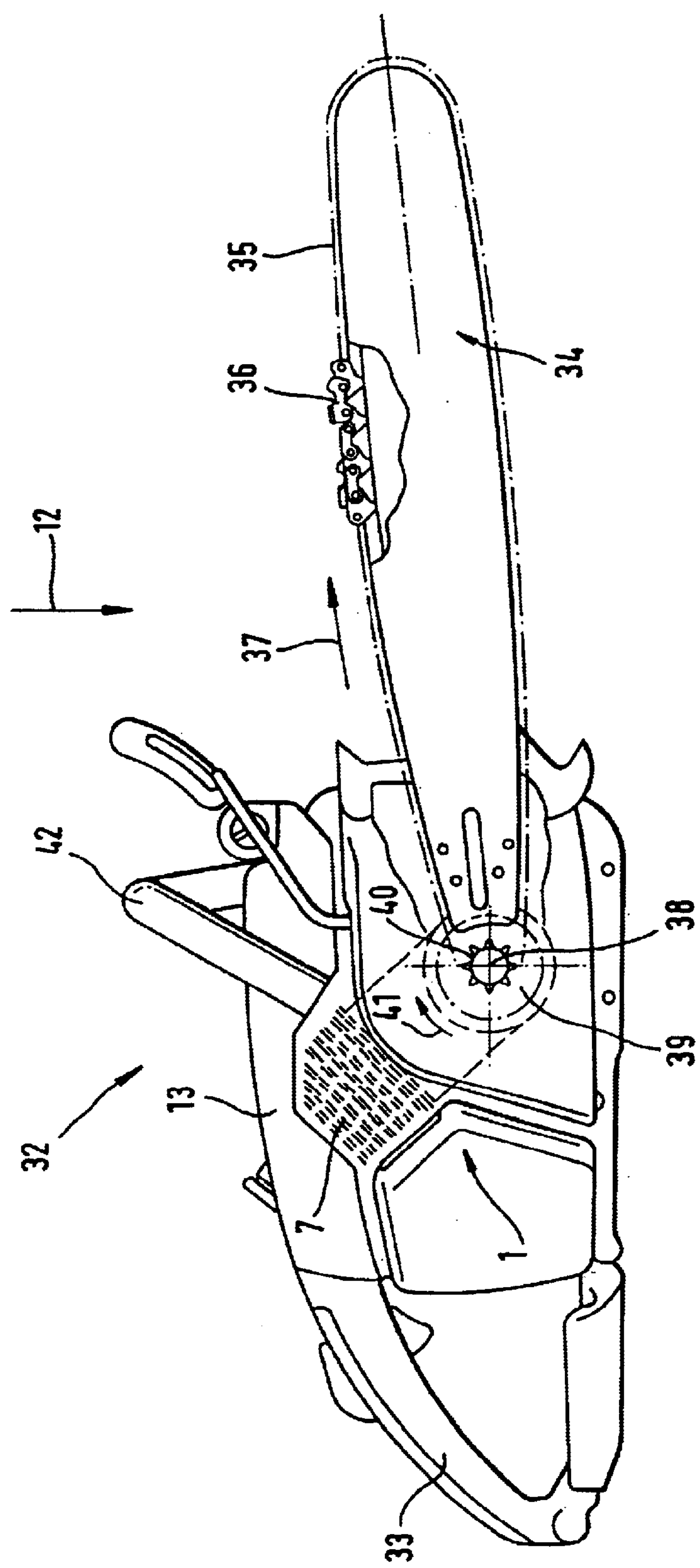
FIG. 1 is a general view of a manually guided, portable implement, here by way of example as a chainsaw.

The implement of the present invention is characterized primarily in that a warming medium that is heated up by the internal combustion engine is passed by only the outer surfaces of the carburetor, whereby the warming medium is separate from the combustion air stream. Heating up the outer surfaces of the carburetor also leads, via heat conduction, to a heating on the inside in the region of the fuel nozzle, as a result of which air moisture that is carried along in the combustion air stream and condenses out cannot freeze up. This reliably ensures that icing over of the carburetor will be prevented over a wide temperature range. By separating the guidance of the warming medium from the combustion air stream, the latter remains cold and dry in conformity with the environmental conditions, whereby due to the appropriately high air density, a high output potential of the internal combustion engine is ensured. The existing air filter, and its housing, require no modification, since no devices are required for the introduction of heated-up combustion air.

Due to the separation of the guidance of the warming medium on the one hand from the combustion air stream on the other hand, various warming media can be used. The warming media can be selected exclusively on the basis of their heating effect and not with regard to its effect upon the engine output. For example, a partial stream of the hot exhaust gases can be withdrawn from the exhaust gas and can be supplied as warming medium to the outer surfaces of the carburetor. Pursuant to one advantageous embodiment, air that has been heated up by the internal combustion engine is selected as the warming medium, thereby largely avoiding a fouling of the outer surfaces of the carburetor and of the moveable parts mounted thereon. To avoid icing over of the carburetor, the air can, for example, be heated on hot parts of the muffler; the air is expediently branched off from a cooling air stream of the cylinder of the internal combustion engine. As a result, the expenditure for additional means for heating the warming medium is eliminated. The cooling air stream, which is in particular driven by a radial-flow fan of the implement, absorbs sufficient kinetic energy as it passes by along the cylinder and is thereby heated, so that it is not necessary to have any additional devices for conveying the warming medium to the carburetor.

Pursuant to one expedient embodiment, a de-icing channel is provided in which are disposed the outer surfaces of the carburetor and through which the warming medium is guided past the outer surfaces of the carburetor. In this way, a defined guidance of the warming medium and a desired uniform heating of the carburetor can be achieved. The outer surfaces of the carburetor thus serve as heat exchanger surfaces. In this connection, the de-icing channel is expediently provided with a cross-sectional area that widens in the direction of flow of the warming medium, thereby preventing, for example, sawdust or chips from a chainsaw carried along in the cooling air stream from accumulating or backing up in the de-icing channel. With regard to the direction of the force of gravity during a conventional operating position of the implement, and relative to the direction of flow in the de-icing channel, the de-icing channel is oriented is such a way that the inlet into the de-icing channel is disposed above its outlet. Sawdust, chips, dirt particles or the like that are carried along can thereby fall downwardly out of the de-icing channel with the aid of the force of gravity.

In one advantageous further embodiment, a housing wall is disposed between the internal combustion engine and the carburetor. This wall of the implement housing is in particular disposed in the vibration gap that separates the components where a vibration uncoupling means is provided between the carburetor and the internal combustion engine. Such a wall forms a first channel wall of the de-icing channel. This housing wall, without additional structural or manufacturing expenditure, fulfills a double function, namely on the one hand the guidance of the warming medium in cold weather operation, and on the other hand during so-called summer operation the shielding of the carburetor from the cooling air that cools the internal combustion engine.

In an expedient further development, a second channel wall of the de-icing channel is formed by an air filter housing wall. Also in this region no additional expenditure is necessary to form a channel for the warming medium. In cold weather or winter operation, when the heated warming medium flows through the de-icing channel, the air filter housing wall is also heated up. In a manner comparable to a heat exchanger, there is thereby also effected a heating up of the interior of the air filter housing, and hence, a heating up of the intake air stream. However, in so doing the de-icing stream remains separate from the intake air stream, as a result of which a mixing and hence an increase of the moisture content in the combustion air stream is prevented.

Pursuant to one advantageous further development, a control element for controlling the supply of the warming medium is provided. By means of this control element, a de-icing of the carburetor can occur in a precise manner. In this connection, the control element is expediently provided in the region of means that increase the pressure head of the cooling air stream. These means are, in particular, a cowling wall that is disposed in the region of the cylinder transverse to the main direction of flow of the cooling air stream. Due to the backing-up of the heated-up cooling air stream, there results a higher pressure that simplifies an effective regulation or control of the supply of warming medium to the carburetor. For further enhancement, the control element has an aerodynamically shaped deflection surface via which the warming medium can be deflected in the direction toward the carburetor with little of loss of flow. As a result, on the whole the amount withdrawn from the cooling air stream can be kept small. In this connection, the control element is expediently disposed in the region of a de-icing window that can be closed off by the control element and that is disposed in particular in the aforementioned housing wall. The de-icing window is provided in the region in which the warming medium is already preheated. By connecting the control element with the aforementioned de-icing window, a precise control for regulation of the supply of warm air to the carburetor is improved. In particular, if necessary, for example during summer operation, the de-icing window can be completely and reliably closed off by the control element, whereby during summer operation an undesired supply of heat to the carburetor is prevented.

Pursuant to one advantageous further development, the control element is embodied as a shift element that can be selectively shifted into a position that supplies the warming medium to the carburetor or into a position that interrupts the supply. As a result of the defined positioning into two end positions, the danger of an incorrect operation is reduced, and at the same time the possibility is provided for embodying the shift element in a straightforward and economical manner. Pursuant to an expedient variant, the shift element is embodied as a change-over insert that can be inserted into the aforementioned de-icing window in two positions that are rotated by 180° relative to its longitudinal axis. This change-over insert has a sealing edge that is radially spaced relative to its longitudinal axis. In an inserted position, the sealing edge rests against an edge of the de-icing window and thereby interrupts the flow of the warming medium to the carburetor. In its position that is rotated by 180°, due to its radial spacing relative to the longitudinal axis, the sealing edge is moved away from the edge of the de-icing window, as a result of which the warming medium, in particular aided by the aerodynamically shaped deflection surface, passes through the de-icing window and through the de-icing channel to the carburetor. Such a change-over insert can, for example, be produced in a straightforward and economical manner under mass-production conditions as an injection molded part of plastic, even in a complex shape. The alternating changing of the position of the change-over insert can be easily undertaken by an operator in a reliable manner without the danger of error.

Pursuant to a further variant, the shift element is embodied as an angular plate, especially of sheet metal, and has two legs. In this connection, in each case one of the two legs is selectively insertable into the aforementioned de-icing window. The first leg has a planar configuration, as a result of which when it is inserted the de-icing window is sealed off. The second leg has an opening or aperture, whereby when this leg with its aperture is inserted, the de-icing window is uncovered. This variant is also easy to operate, whereby when embodied as a sheet metal part only a low manufacturing cost is required. The control elements expediently have a gripping part that is disposed outside of the implement housing, whereby shifting over from summer operation to winter operation, and vice versa, is made possible by the gripping part without having to otherwise open up the implement housing.

Further specific features of the present invention will be described in detail subsequently.

DESCRIPTION OF PREFERRED EMBODIMENTS

Referring now to the drawings in detail, FIG. 1 schematically illustrates a manually guided, portable implement, here by way of example a chainsaw 32 having an internal combustion engine 1. Other manually guided implements, such as brush cutters, trimmers, vacuum or blower devices, cut-off machines, etc. having an internal combustion engine as a drive motor can also be embodied in conformity with the present invention. The chainsaw 32 is shown in its conventional operating position relative to the direction of the force of gravity, which is indicated by the arrow 12. The chainsaw 32 has an implement housing 13 with two handles 33 and 42. The internal combustion engine 1, in the implement housing 13, has a cylinder 7 and, via a non-illustrated piston that is moveably guided in the cylinder 7, drives a piston or connecting rod and a crankshaft, as well as, via a clutch 39, a drive gear 40. On its side that is opposite the handle 33, the chainsaw 32 has a guide bar 34 for a circulating saw chain 35, which is comprised of individual chain links 36. By rotating the drive gear 40 about the crankshaft axis 38 in the direction of the arrow 41, the saw chain 35 is driven in the direction of the arrow 37.

Figure 2:
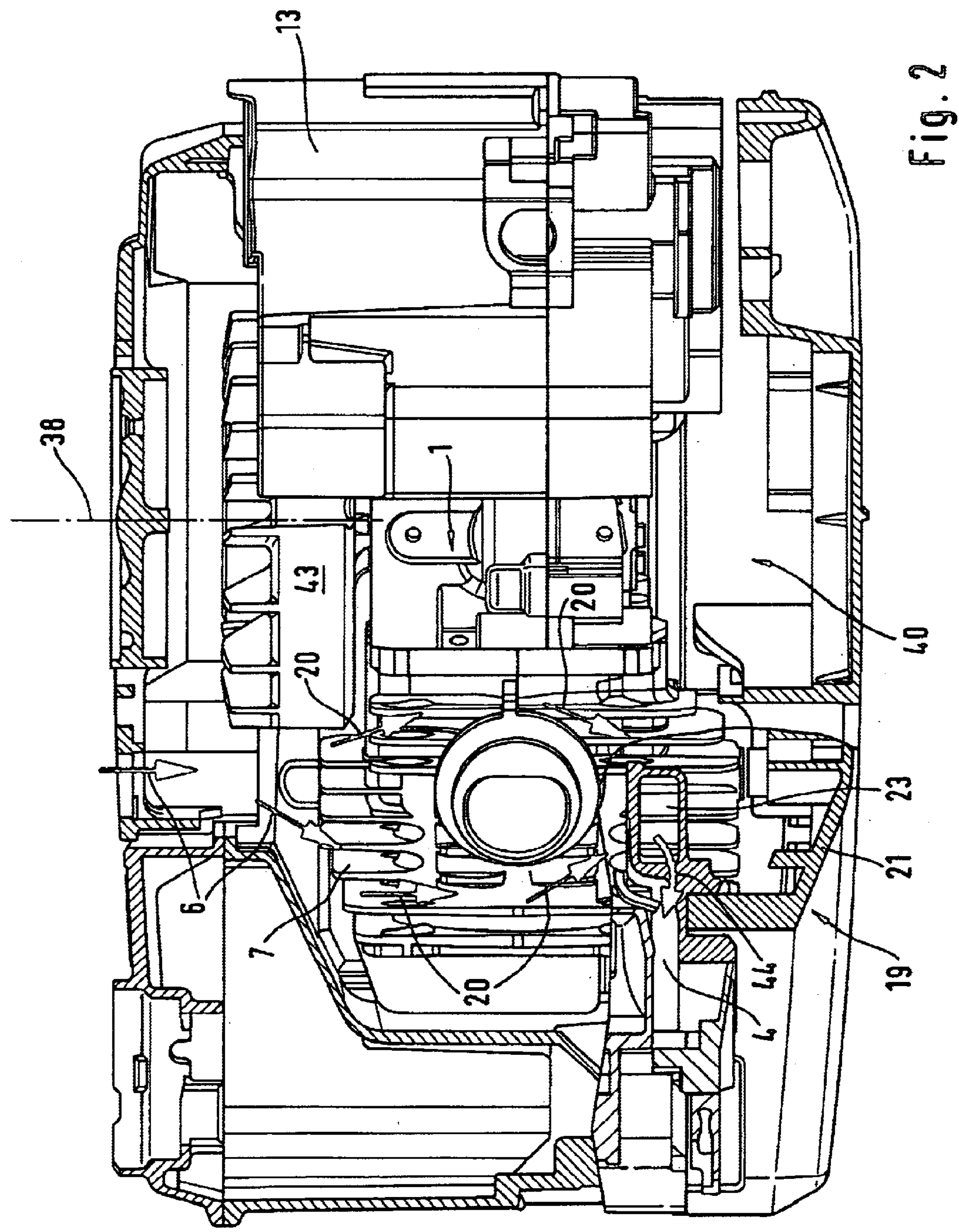
FIG. 2 is a cross-sectional view taken in the region of the implement housing of the chainsaw of FIG. 1.

The cross-sectional illustration of FIG. 2 is a top view of the chainsaw 32 of FIG. 1 in the region of its implement housing 13. To convey a cooling air stream 6, on that side of the internal combustion engine 1 that is disposed remote from the drive gear 40, a radial-flow fan 43 is provided that is rotatable about the crankshaft axis 38. To facilitate illustration, the drive gear 40 of FIG. 1 is not illustrated in FIG. 2. The cooling air stream 6 passes by along the cylinder 7 in the main direction of flow indicated by the arrows 20; in so doing, the cooling air stream 6 is heated up. Means 19 for increasing the pressure head are provided downstream of the main direction of flow 20; in the illustrated embodiment, the means 19 are formed by a cowling wall 21. However, a hood, a baffle plate, or the like could also be provided. A de-icing window 23 is provided in the region of the means 19, whereby by means of the window 23 a partial stream 44 is branched off from the cooling air stream 6. The partial stream 44 comprises air as warming medium 4 to avoid icing over of a carburetor 2 (see e.g. FIGS. 3 and 7). The warming medium 4 can also be the air heated up by the non-illustrated muffler, a partial stream of exhaust gas, or a mixture of air and exhaust gas.

Figure 3:
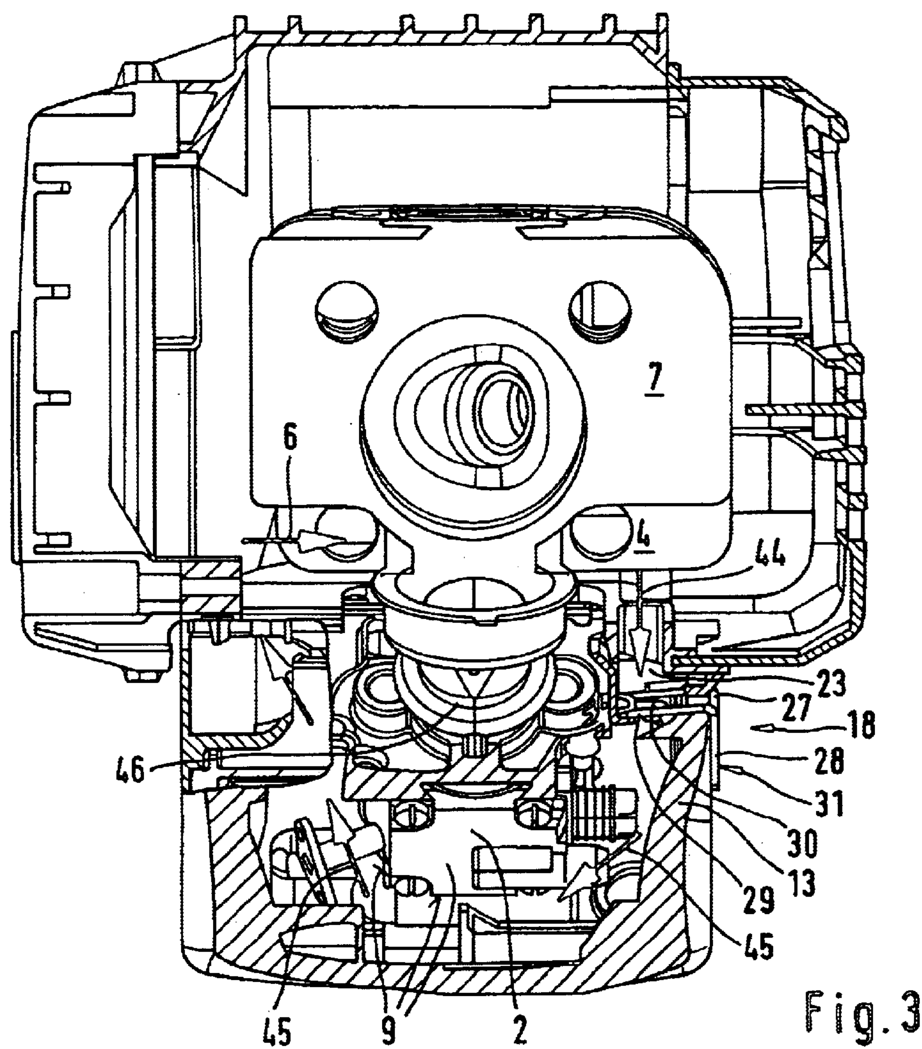
FIG. 3 is a further cross-sectional view through the implement housing of FIGS. 1 and 2 in the region of the cylinder and the carburetor.

The cross-sectional illustration of FIG. 3 shows a further view of the arrangement of FIG. 2, whereby the carburetor 2 is connected via an elastic spacer 46 with the cylinder 7 in a vibration-neutralized manner. Provided in the region of the de-icing window 23, for controlling the supply of the warming medium 4, is a control element 18 that is embodied as a shift element 24 which in the illustrated embodiment is in the form of an angular plate 27 having two legs 28 and 29. The two legs 28, 29 can be selectively placed into the de-icing window 23; in the illustrated variant, the leg 29, with a window 30, is inserted. The warming medium 4, as a partial stream 44 of the cooling air stream 6, is guided through the de-icing window 23 and through the opening or aperture 30 and past the outer surfaces 9 of the carburetor 2 in the direction of the arrows 45.

Figure 4:
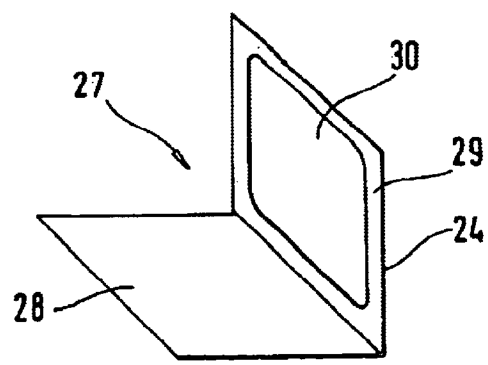
FIG. 4 is a schematic illustration of a control element in the form of an angular plate for the arrangement of FIG. 3.

The schematic illustration of FIG. 4 shows details of the angular plate 27 of FIG. 3 with its two legs 28 and 29. The leg 28 is planar, which upon placement in the de-icing window 23 (FIG. 3) leads to the closing thereof. The second leg 29 has a frame shape with an aperture 30, which in conformity with FIG. 3 uncovers the de-icing window 23. Pursuant to FIG. 3, the leg 28 is disposed outside of the implement housing 13 and forms a gripping part 31 for pulling the element out and changing its orientation. When the leg 28 is placed into the de-icing window 23, the second leg 29 forms the gripping part 31.

Figure 5:
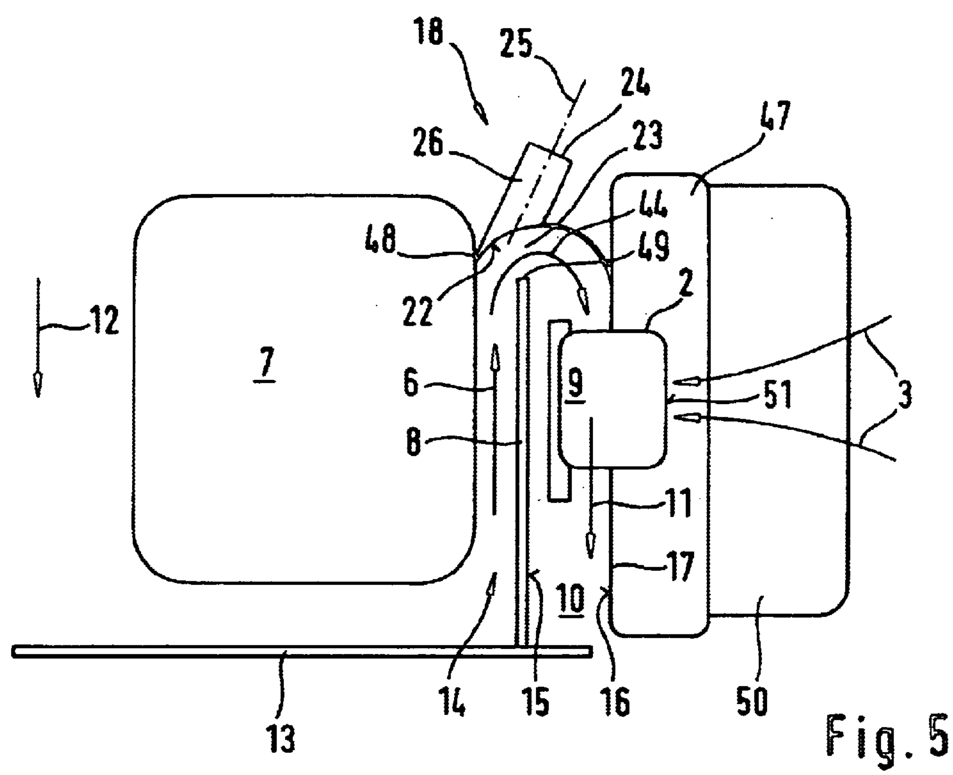
FIG. 5 is a schematic illustration of the guidance of the warming medium via a change-over insert.

The schematic illustration of FIG. 5 shows a further arrangement in a plan view, in other words in the direction of the force of gravity 12, with the control element 18 being embodied as a change-over insert 26. That end of the insert 26 that faces the de-icing window 23 is provided with a sealing edge 48 that is radially spaced relative to the longitudinal axis 25 of the insert. Adjoining the sealing edge 48 is an aerodynamically shaped, rounded deflection surface 22. The cooling air stream 6 passes by the cylinder 7, as a result of which it is heated up. By means of the deflection surface 22 of the change-over insert 26, a heated-up partial stream 44 of the cooling air stream 6 is branched off and is deflected in the direction of the carburetor 2.

The cylinder 7 is disposed in an implement housing 13 having a housing wall 8. In conformity with FIG. 3, the carburetor 2 and the cylinder 7 are uncoupled from one another with regard to vibration via an elastic spacer 46, as a result of which a vibration gap 14 is formed between the carburetor and the cylinder. The housing wall 8 is disposed in the vibration gap 14, and downstream of the cylinder 7, in the direction of the cooling air stream 6, is provided with the de-icing window 23. On that side that is remote from the cylinder 7, the carburetor 2 is provided with an intake opening 51 for drawing in a stream 3 of combustion air. In the region of the intake opening 51, the carburetor 2 is covered by an air filter housing 47 having an air filter 50 through which the combustion air stream 3 is guided. By means of the housing wall 8, and a housing wall 17 of the air filter housing 47 that faces the cylinder 7, two channel walls 15, 16 of a de-icing channel 10 are formed through which the partial stream 44 is guided against the outer surfaces 9 of the carburetor 2 in the direction of the arrow 11. By means of the channel 10, the partial stream 44 is guided separate from the combustion air stream 3.

Figure 6:
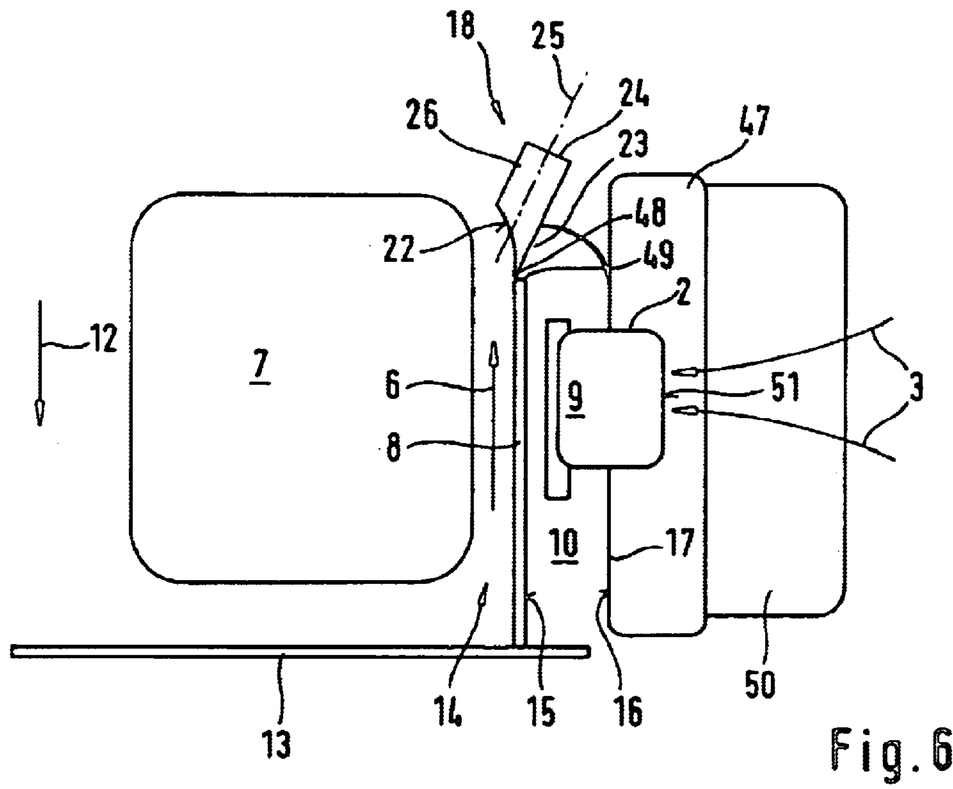
FIG. 6 shows the arrangement of FIG. 5 with the insert in the closed position.

The control element 18 can be placed into the de-icing window 23 in two positions which are rotated relative to its longitudinal axis 25 by 180°. With the insertion position shown in FIG. 5, the de-icing window 23 is uncovered or released, and the partial stream 44 is guided through. FIG. 6 shows the same arrangement as in FIG. 5, but with the change-over insert 26 being placed in a position rotated by 180° from that shown in FIG. 5. In this connection, the sealing edge 48 rests against an edge 49 of the de-icing window 23, as a result of which the de-icing window is closed and the supply of the partial stream 44 to the outer surfaces 9 of the carburetor 2 is interrupted. The remaining features and reference numerals of the arrangement of FIG. 6 coincide with the arrangement of FIG. 5.

The control elements 18 shown in FIGS. 4 to 7 are embodied as shift elements 24 that can be placed and hence shifted selectively into two different positions, namely into a position that supplies the warming medium 4 to the carburetor 2, or into a position that interrupts such supply. In addition, embodiments can be expedient according to which, for example, by means of a rotation device a multistage or also stepless supply of the warming medium 4 can be set. In addition to the illustrated insertable shift elements 24, rotary pivotable elements 18 can be provided.

Figure 7:
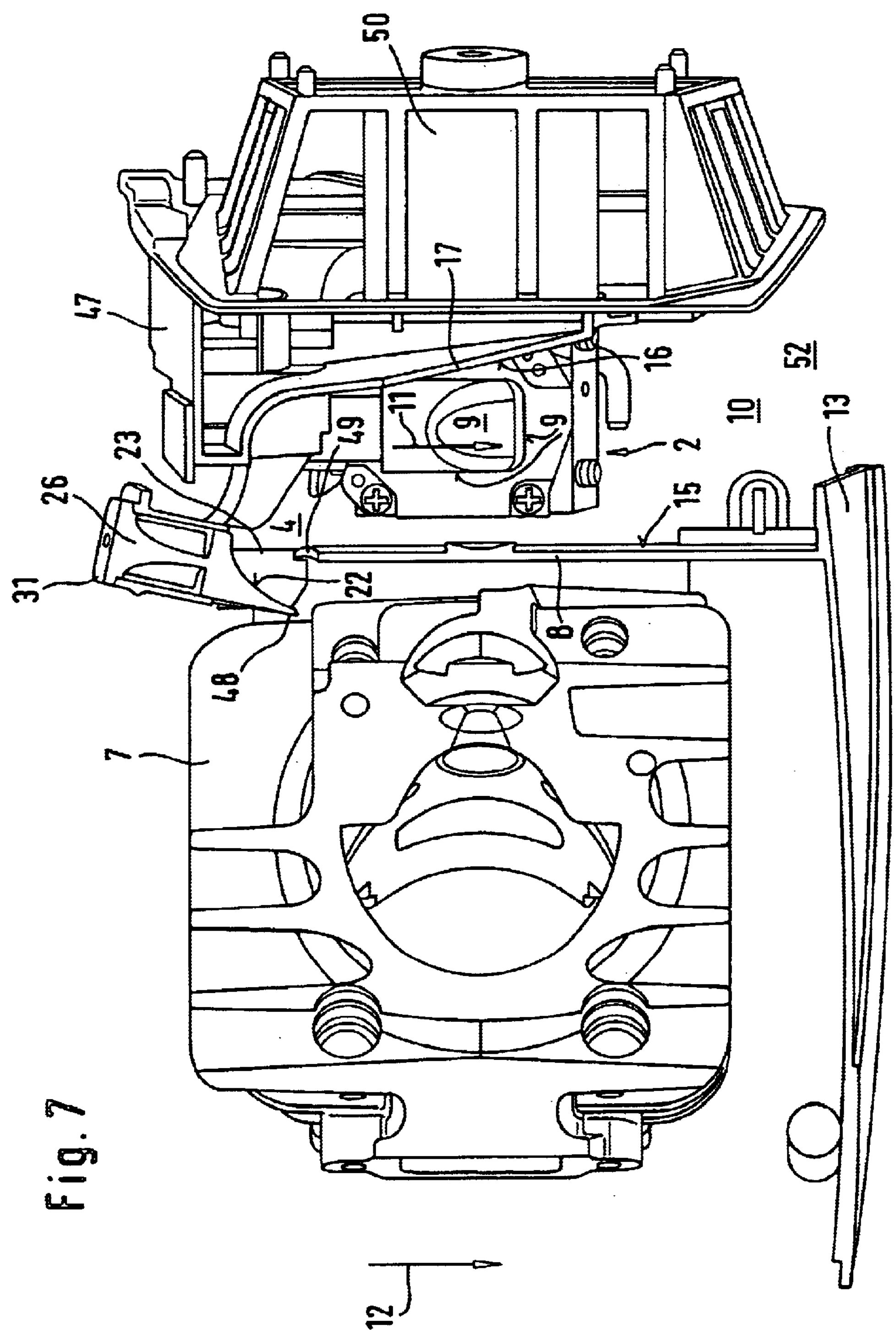
FIG. 7 is a detailed cross-sectional view of an implement having a cylinder, a carburetor and an air filter in conformity with the schematic arrangement of FIG. 5.

FIG. 7 shows details of an embodiment that corresponds to the drawings of the principle of FIGS. 5 and 6. In this embodiment, the change-over insert 26 is embodied as an injection molded plastic part having its convexly curved deflection surface 22 and its sealing edge 48; the insert 26 has a gripping part 31 that is disposed on the outside relative to the implement housing 13. The warming medium 4 is passed through the de-icing channel 10 in the direction of flow 11 against the outer surfaces 9 of the carburetor 2. In this connection, the housing wall 8, which forms a first channel wall 15 of the de-icing channel 10, is disposed approximately parallel to the direction of the force of gravity 12. A second channel wall 16 is formed by a housing wall 17 of the air filter housing 47 and, relative to the first channel wall 15, has a first component in the direction of the force of gravity 12 and a second component that is inclined transverse thereto and that widens the cross-sectional area of the de-icing channel 10 in the direction of flow 11. The inlet of the de-icing channel 10 is formed by the de-icing window 23. The outlet is disposed on that side of the implement housing 13 that is remote from the de-icing window 23 and, relative to the direction of the force of gravity 12, is disposed below the window 23 in the conventional position of operation of the implement in conformity with FIG. 1. As a result, the direction of flow 11 extends diagonally between the two channel walls 15, 16, with a component in the direction of the force of gravity 12 and transverse thereto.

The specification incorporates by reference the disclosure of priority document DE20103829.3 of Mar. 6, 2001.

The present invention is, of course, in no way restricted to the specific disclosure of the specification and drawings, but also encompasses any modifications within the scope of the appended claims.

What is claimed is:

1. A manually guided implement having an internal combustion engine and a carburetor for supplying a fuel/air mixture to said engine, wherein a stream of air for combustion is drawn through said carburetor via said engine, said implement further comprising:

means for passing warming medium, which is heated up by said internal combustion engine, along outer surfaces of said carburetor, wherein said warming medium is separate from said stream of air for combustion.

2. An implement according to claim 1, wherein said warming medium is air.

3. An implement according to claim 2, wherein said air is branched off from a cooling air stream for a cylinder of said internal combustion internal engine.

4. An implement according to claim 3, wherein a radial-flow fan is provided for driving said cooling air stream.

5. An implement according to claim 1, wherein a de-icing channel is provided for guidance of said warming medium, and wherein said outer surfaces of said carburetor are disposed in said de-icing channel.

6. An implement according to claim 5, wherein said de-icing channel has a cross-section that widens in a direction of flow of said warming medium.

7. An implement according to claim 5, wherein in a direction of flow of said warming medium, relative to a direction of the force of gravity during a normal operating position of said implement, an inlet into said de-icing channel is disposed above an outlet thereof.

8. An implement according to claim 5, wherein a wall of a housing of said implement is disposed between said internal combustion engine and said carburetor, and wherein said housing wall forms a first channel wall of said de-icing channel.

9. An implement according to claim 8, wherein said housing wall is disposed in a vibration gap that provides a vibration uncoupling between said carburetor and said internal combustion engine.

10. An implement according to claim 8, wherein a second channel wall of said de-icing channel is formed by a housing wall of an air filter.

11. An implement according to claim 1, wherein a control element is provided for controlling the supply of warming medium to said carburetor.

12. An implement according to claim 11, wherein means are provided for increasing a pressure head of a cooling air stream for a cylinder of said internal combustion engine, and wherein said control element is disposed in the region of said means.

13. An implement according to claim 12, wherein said means to increase the pressure head of said cooling air stream is a cowling wall that is disposed transverse to a main flow direction of said cooling air stream.

14. An implement according to claim 11, wherein said control element 18 is provided with an aerodynamically shaped deflection surface for said warming medium.

15. An implement according to claim 12, wherein said control element is disposed in the region of a de-icing window disposed in a flow path for said warming medium, wherein said de-icing window is closeable by said control element.

16. An implement according to claim 15, wherein said de-icing window is disposed in a wall of a housing of said implement.

17. An implement according to claim 12, wherein said control element is a shift element that is selectively shiftable into a position that supplies said warming medium to said carburetor, or into a position that interrupts such a supply.

18. An implement according to claim 17, wherein said shift element is a change-over insert that is insertable into a de-icing window, which is disposed in a flow path for said warming medium, in two positions that are rotated by 180° relative to a longitudinal axis of said insert, and wherein said insert is provided with a sealing edge that is radially spaced from its longitudinal axis for a selective sealing engagement against an edge of said de-icing window.

19. An implement according to claim 17, wherein said shift element is an angular plate, especially of sheet metal, having two legs, wherein said plate is selectively insertable with one of said two legs into a de-icing window that is disposed in a flow path for said warming medium, wherein a first one of said legs acts upon said de-icing window in a sealing manner, and wherein a second one of said legs is provided with an aperture for at least partially uncovering said de-icing window.

20. An implement according to claim 11, wherein said control element is provided with a gripping part that is disposed outside of a housing of said implement.

21. A manually guided implement having an internal combustion engine and a carburetor for supplying a fuel/air mixture to said engine, wherein a stream of air for combustion is drawn through said carburetor via said engine, said implement further comprising:

means for passing warming medium, in the form of air, which is heated up by said internal combustion engine, along outer surfaces of said carburetor, wherein said warming medium is separate from said stream of air for combustion, wherein said warming medium is branched off from a cooling air stream for a cylinder of said internal combustion internal engine; and a radial-flow fan for driving said cooling air stream.

22. A manually guided implement having an internal combustion engine and a carburetor for supplying a fuel/air mixture to said engine, wherein a stream of air for combustion is drawn through said carburetor via said engine, said implement further comprising:

means for passing warming medium, which is heated up by said internal combustion engine, along outer surfaces of said carburetor, wherein said warming medium is separate from said stream of air for combustion, wherein a de-icing channel is provided for guidance of said warming medium, and wherein said outer surfaces of said carburetor are disposed in said de-icing channel.

23. A manually guided implement having an internal combustion engine and a carburetor for supplying a fuel/air mixture to said engine, wherein a stream of air for combustion is drawn through said carburetor via said engine, said implement further comprising:

means for passing warming medium, which is heated up by said internal combustion engine, along outer surfaces of said carburetor, wherein said warming medium is separate from said stream of air for combustion;

a control element for controlling the supply of warming medium to said carburetor; and means for increasing a pressure head of a cooling air stream for a cylinder of said internal combustion engine, wherein said control element is disposed in the region of said means.

24. A manually guided implement having an internal combustion engine and a carburetor for supplying a fuel/air mixture to said engine, wherein a stream of air for combustion is drawn through said carburetor via said engine, said implement further comprising:

means for passing warming medium, which is heated up by said internal combustion engine, along outer surfaces of said carburetor, wherein said warming medium is separate from said stream of air for combustion; and a control element for controlling the supply of warming medium to said carburetor, wherein said control element is provided with an aerodynamically shaped deflection surface for said warming medium.

25. A manually guided implement having an internal combustion engine and a carburetor for supplying a fuel/air mixture to said engine, wherein a stream of air for combustion is drawn through said carburetor via said engine, said implement further comprising:

means for passing warming medium, which is heated up by said internal combustion engine, along outer surfaces of said carburetor, wherein said warming medium is separate from said stream of air for combustion; and a control element for controlling the supply of warming medium to said carburetor, wherein said control element is provided with a gripping part that is disposed outside of a housing of said implement.

* * * * *